US012327025B2

(12) United States Patent
Chujo et al.

(10) Patent No.: US 12,327,025 B2
(45) Date of Patent: Jun. 10, 2025

(54) STORAGE SYSTEM HAVING CONTROL UNITS TO PERFORM DATA CONTROL AND METHOD OF PERFORMING DATA CONTROL IN THE STORAGE SYSTEM

(71) Applicant: Hitachi, Ltd., Tokyo (JP)

(72) Inventors: Norio Chujo, Tokyo (JP); Kentaro Shimada, Tokyo (JP)

(73) Assignee: Hitachi Vantara, Ltd., Yokohama (JP)

( * ) Notice: Subject to any disclaimer, the term of this patent is extended or adjusted under 35 U.S.C. 154(b) by 1 day.

(21) Appl. No.: 18/119,255

(22) Filed: Mar. 8, 2023

(65) Prior Publication Data

US 2024/0103740 A1  Mar. 28, 2024

(30) Foreign Application Priority Data

Sep. 27, 2022  (JP) .................................. 2022-154196

(51) Int. Cl.
*G06F 3/00* (2006.01)
*G06F 3/06* (2006.01)
*G06F 12/0804* (2016.01)
*G06F 12/10* (2016.01)

(52) U.S. Cl.
CPC .......... *G06F 3/0619* (2013.01); *G06F 3/0659* (2013.01); *G06F 3/067* (2013.01); *G06F 12/0804* (2013.01); *G06F 12/10* (2013.01)

(58) Field of Classification Search
CPC ...... G06F 12/10; G06F 12/0802; G06F 3/067; G06F 3/0659
See application file for complete search history.

(56) References Cited

U.S. PATENT DOCUMENTS

| | | | |
|---|---|---|---|
| 6,438,647 B1 * | 8/2002 | Nielson | G06F 12/0804 711/E12.04 |
| 2006/0140008 A1 * | 6/2006 | Hirako | G06F 3/0656 365/185.22 |
| 2008/0229049 A1 * | 9/2008 | Nanda | G06F 13/1657 711/173 |
| 2020/0004463 A1 * | 1/2020 | Kobayashi | G06F 3/0646 |

FOREIGN PATENT DOCUMENTS

JP  2016-513316 A  5/2016

* cited by examiner

*Primary Examiner* — Reginald G Bragdon
*Assistant Examiner* — Michael L Westbrook
(74) *Attorney, Agent, or Firm* — Foley & Lardner LLP

(57) ABSTRACT

A storage system having a plurality of control units that perform read control of data stored in a storage and write control of the data, the storage system comprising, each of the plurality of control units has a processor, a first memory connected to the processor and storing software for executing a process of read control and write control, a network interface for connecting to a control unit network that connects each of the plurality of control units, and a second memory connected to the network interface and storing control information of the data subject to read control and write control and cache data of the storage.

7 Claims, 17 Drawing Sheets

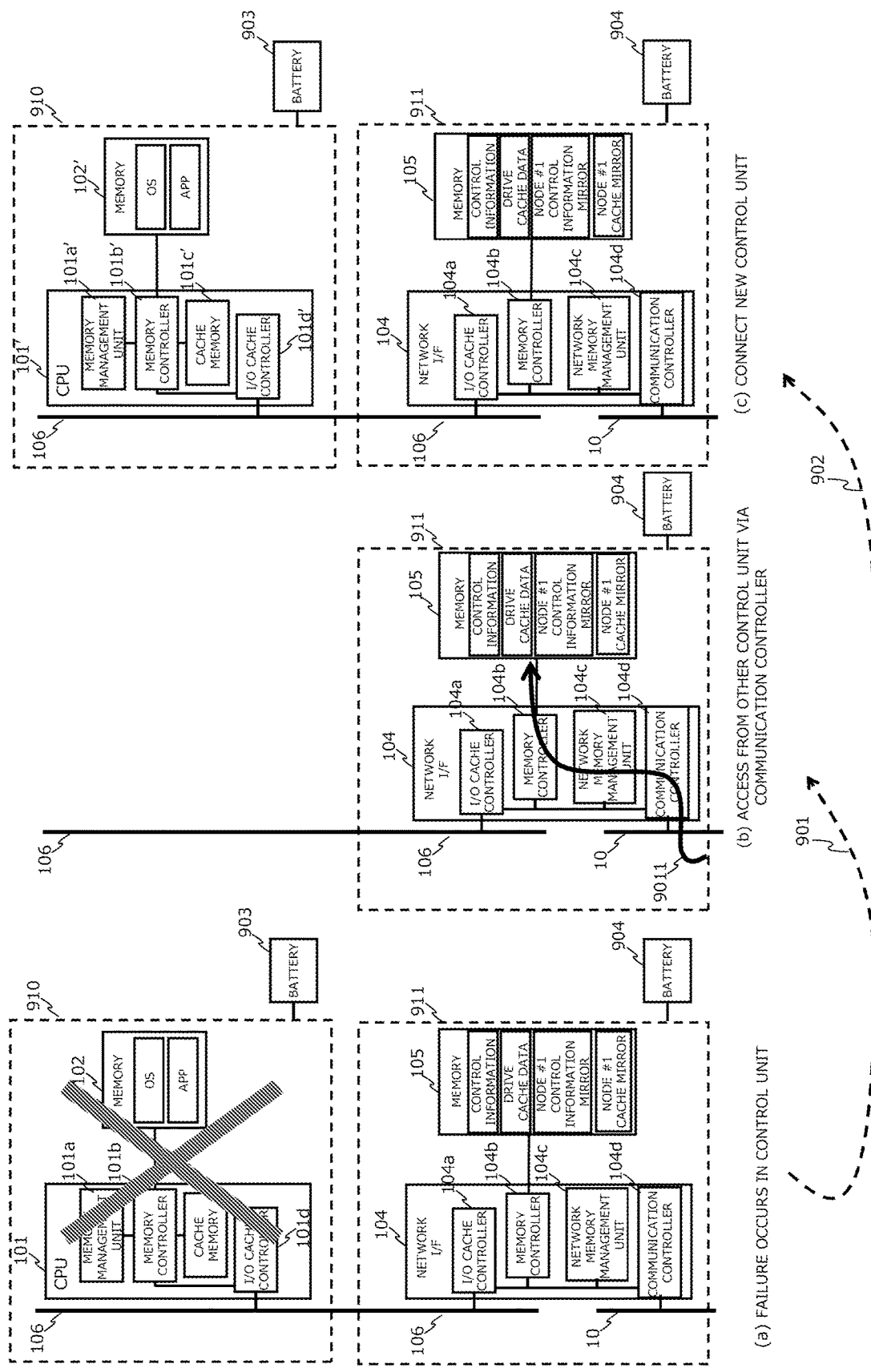

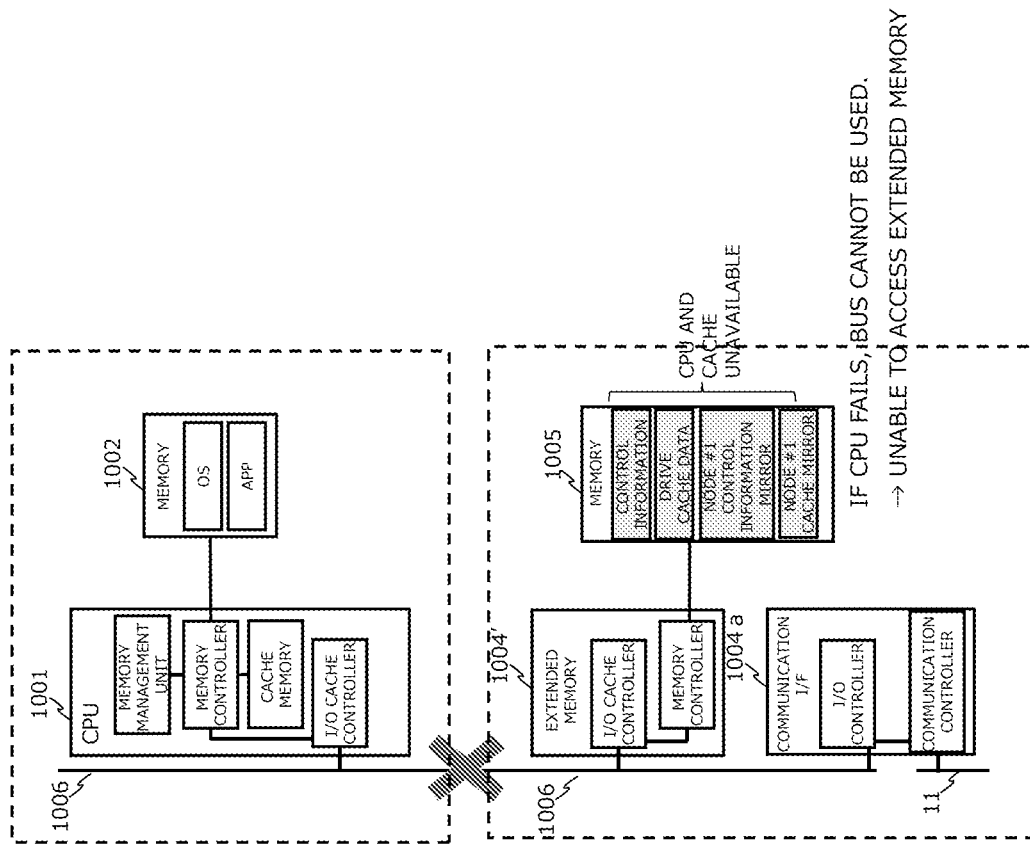

STORAGE SYSTEM HAVING CONTROL UNITS TO PERFORM DATA CONTROL AND METHOD OF PERFORMING DATA CONTROL IN THE STORAGE SYSTEM

BACKGROUND OF THE INVENTION

1. Field of the Invention

The present invention relates to a storage system and a data control method.

2. Description of the Related Art

Conventionally, storage devices are connected to multiple nodes to increase processing capacity through scale-out and to improve reliability by copying cache and control information to other nodes. Multiple nodes are connected by a network such as a storage area network (SAN), and the central processing unit (CPU) is used to interpret network commands and translate the data control information contained in the commands to the memory addresses of each node. However, the ability of the CPU (Central Processing Unit) to send and receive data by interpreting network commands and translating control information of the data contained in the commands to memory addresses for each node is reduced. A technology to solve these issues is, for example, described in P2016-513316A, it describes that multiple memory sharing devices and corresponding control unit s, wherein any of the memory sharing devices has memory units that are addressed in a unified manner.

SUMMARY OF THE INVENTION

The P2016-513316A allocates a uniform memory address to shared memory, which means that each control unit manages a different address range. This requires a dedicated program for each control unit, which is time-consuming and costly. In the P2016-513316A, when the CPU of a control unit has a cache memory to speed up processing, it is necessary to check whether the data in the memory to be accessed is stored in the cache memory of the CPU of the control unit on the other node via the communication interface in advance when accessing the shared memory. Therefore it increases the memory access overhead. Furthermore, if one control unit fails, the memory of that control unit cannot be accessed, and the entire system comes to a halt, thus reducing the reliability of the system.

An aspect of the present invention is to provide a technology that enables storage systems with an efficient memory sharing mechanism while maintaining high reliability.

The storage system of the present invention is a storage system having a plurality of control units that perform read control of data stored in the storage and write control of the data, each of the plurality of control units comprising, a processor, a first memory connected to the processor for storing software for performing the read control and write control, a network interface for connecting the plurality of control units to a control unit network that connects each of the plurality of control units, and a second memory that is connected to the network interface and stores data control information for performing the read control and write control and cache data of the storage.

According to the present invention, it is possible to construct a storage system with an efficient memory sharing mechanism while maintaining high reliability. Problems, configurations and effects other than those described above will be clarified in the following description of the embodiments for implementing the invention.

BRIEF DESCRIPTION OF THE DRAWINGS

FIG. 9 illustrates an example of the effect of this system;

FIG. 10B illustrates the problems that may occur when a failure occurs in a control unit with the conventional configuration;

DESCRIPTION OF THE PREFERRED EMBODIMENTS

Figure 1:
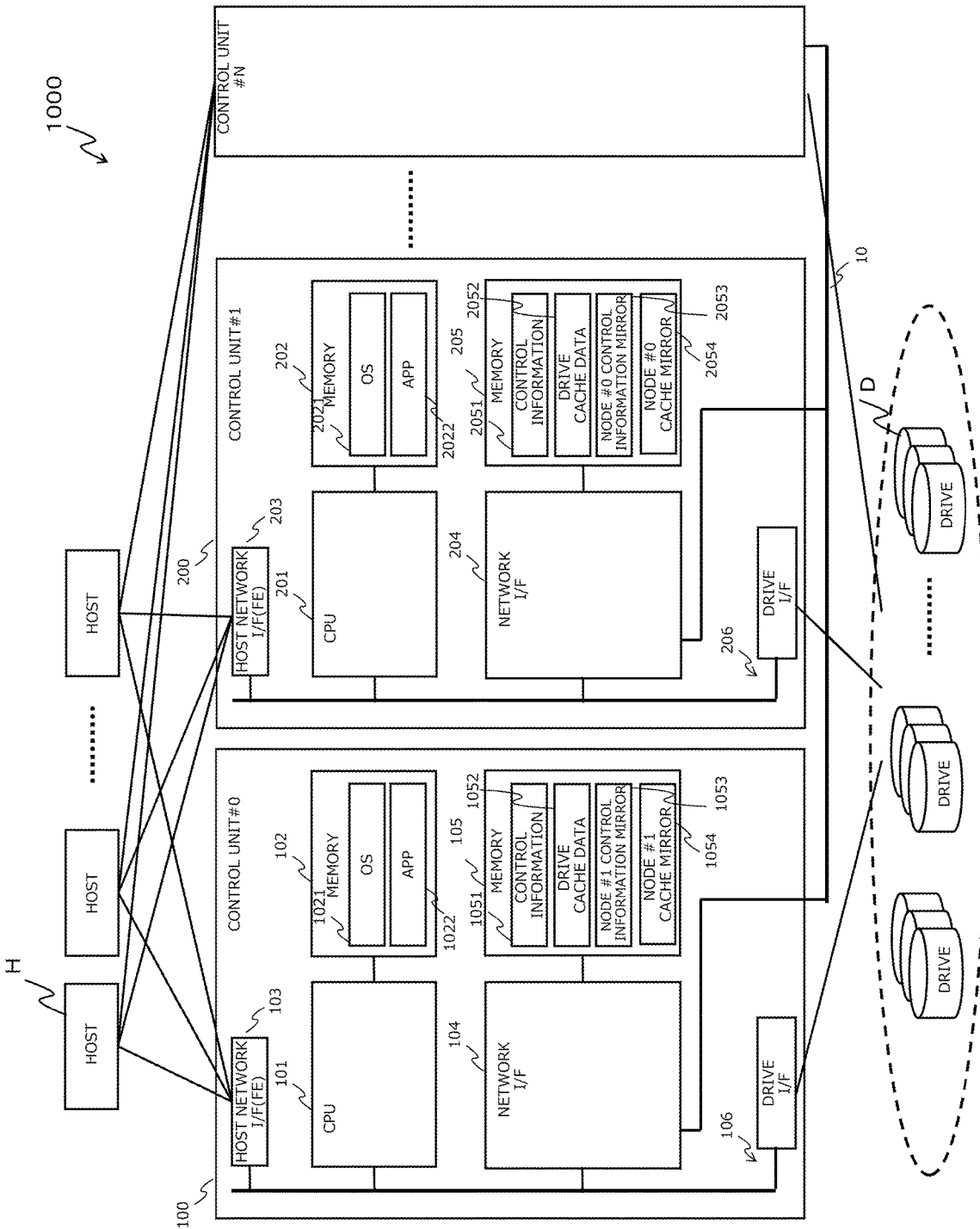
FIG. 1 shows an example of the storage system configuration in this example.

The following description of embodiments of the invention will be made with reference to the drawings. The following description and drawings are illustrative examples to explain the invention, and have been omitted or simplified as appropriate for clarity of explanation. The invention can also be implemented in various other forms. Unless otherwise limited, each component can be singular or plural.

The position, size, shape, extent, etc. of each component shown in the drawings may not represent the actual position, size, shape, extent, etc., in order to facilitate understanding of the invention. Therefore, the invention is not necessarily limited to the position, size, shape, range, etc. disclosed in the drawings.

In the following explanations, various types of information may be described using expressions such as "database," "table," "list," etc. However, various types of information may be expressed in data structures other than these. XX table", "XX list", etc. are sometimes called "XX information" to indicate that they do not depend on any data structure. When expressions such as "identification information," "identifier," "name," "ID," "number," etc. are used when describing identification information, they can be substituted for each other.

When there are multiple components having the same or similar functions, the same code may be explained with different subscripts. However, when there is no need to distinguish between these multiple components, the subscripts may be omitted.

In the following description, the processing performed by executing the program may be described, but the program may be executed by a processor (e.g., CPU, GPU (Graphics Processing Unit)) to perform the defined processing while using memory resources (e.g., memory) and/or interface devices (e.g., communication ports), etc., so that the processor may be the main body of processing. Similarly, the subject of the processing performed by executing the program may be a controller, device, system, computer, or node having a processor. The processing entity that executes the program may be an arithmetic unit, and may include a dedicated circuit (e.g., FPGA (Field-Programmable Gate Array) or ASIC (Application Specific Integrated Circuit)) that performs specific processing. The processing entity that executes the program may be an arithmetic unit.

The program may be installed on a device such as a computer from a program source. The program source may be, for example, a program distribution server or a storage medium readable by a computer. If the program source is a program distribution server, the program distribution server may include a processor and a storage resource that stores the program to be distributed, and the processor of the program distribution server may distribute the program to other computers. In the following description, two or more programs may be realized as one program, or one program may be realized as two or more programs.

Example 1

The following is an example of a storage system and storage sharing method.

FIG. 1 shows an example of a storage system in this example. The storage system 1000 in this example has control units for controlling data held in the drives of one or more storages in response to commands from one or more host computers. The system has one or more control units (in FIG. 1, control units 100, 200, . . . ). The control units 100, 200, . . . are communicatively connected to one or more host computers H and drives D of one or more storages. The number of control units can be determined arbitrarily according to the environment in which this system is applied, but as an example, the case with two control units, 100 and 200, will be described below.

As shown in FIG. 1, the control unit 100 comprises that a CPU 101, memory 102, host network I/F (interface) 103, network I/F 104, memory 105, and drive I/F 106.

CPU 101 is connected to memory 102 and is a processor that performs various controls between the host computer H and drive D, such as reading (read) data from drive D and writing (write) data to drive D in response to instructions from the host computer H.

The memory 102 is connected to the CPU 101 and stores an operating system(OS) 1021 for controlling the entire processing performed by the control unit 100 and an application 1022 that runs on the OS 1021. The processing performed by the control unit 100 and the functions of the control unit 100 are realized when the CPU 101 reads the OS 1021 and the application 1022 from the memory 102 and executes them.

The host network I/F 103 is a communication interface for connecting the host computer H to the control unit 100.

Network I/F 104 is the interface for connecting drive D via CPU 101 and control unit network 10.

Memory 105 is connected to network I/F 104 and can be shared with another control unit, control unit 200, via the network I/F 104. The memory 105 contains a control information area 1051 for accessing Drive D, a cache data area 1052 of Drive D accessed by the control information area 1051, a mirror data 1053 of the control information of the other control unit (in this case, control unit 200), and a mirror data 1054 of the cache data of drive D accessed by the control information of the above other control unit is stored. The control information is information to access Drive D requested by commands such as read, write, etc. For example, it is information indicating the format of the address of Drive D and the value of the address of the logical volume corresponding to Drive D. The control information is sent and received with the above commands or included in the above commands.

In the control information area 1051, a correspondence table (not shown) is stored between the physical address indicating the storage location in the physical volume of Drive D and the logical address of the logical volume provided to the host. When the logical address of the destination for reading or writing data is sent from the host together with the above command, CPU 101 translates the logical address to a physical address based on the above correspondence table and accesses the physical volume of drive D. In addition, the control information area 1051 stores data that manages which area of data in drive D is cached in the cache data area 1052.

Drive I/F 106 is an interface for interconnecting CPU 101, host network I/F 103, and network I/F 104 of control unit 100, as well as between drive D and control unit 100. The specific functions of each part of the control unit 100 are described below using flowcharts and the like.

The control unit 200 comprises that a CPU 201, memory 202, host network I/F 203, network I/F 204, memory 205, and drive I/F 206.

CPU 201 is connected to memory 202 and is the processor that performs various controls between the host computer H and drive D, as in the case of control unit 100.

Memory 202 is connected to CPU 201 and, as in the case of control unit 100, stores OS 2021 for controlling the entire processing performed by control unit 200 and application 2022 running on OS 2021. The processing performed by the control unit 200 and the functions of the control unit 200 are realized when the CPU 201 reads and executes the OS 2021 and the application 2022 from the memory 202.

The host network I/F 203 is a communication interface for connecting the host computer H to the control unit 200, as in the case of the control unit 100.

Network I/F 204 is an interface for connecting drive D via CPU 201 and control unit network 10, as in the case of control unit 100.

Memory 205 is connected to network I/F 204 and, as in the case of control unit 100, is a memory that can be shared with another control unit, control unit 100, via said network I/F 204. The memory 205 contains control information 2051 to access Drive D, cache data 2052 of Drive D accessed by the control information 2051, mirror data 2053 of the control information of the other control unit (in this case, control unit 100), and mirror data 2054 of cache data of drive D accessed by the control information of the other control unit mentioned above.

Drive I/F 206 is an interface for interconnecting CPU 201, host network I/F 203, and network I/F 204 of control unit 200, as well as between drive D and control unit 100, as in the case of control unit 100. The specific functions of the various parts of the control unit 200 are described below using flowcharts and other means.

Figure 2:
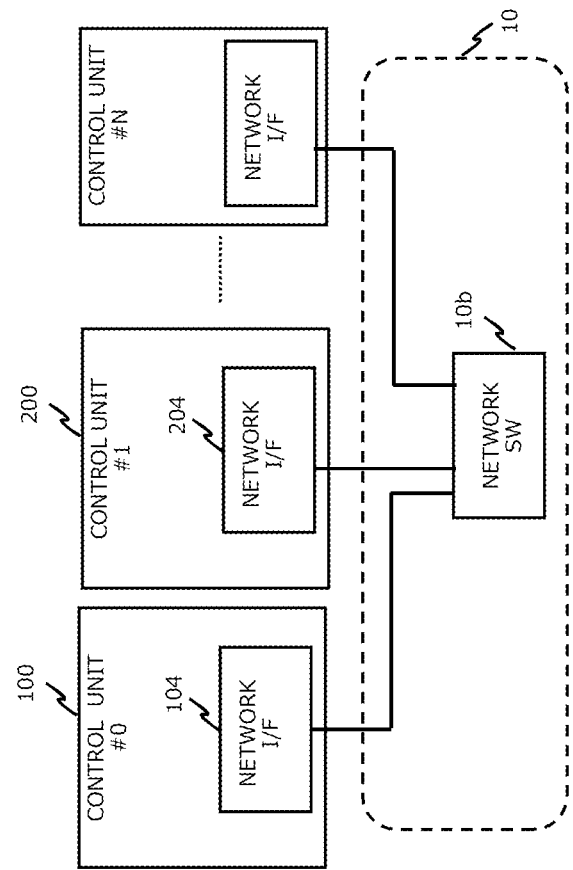
FIG. 2 shows an example of the fabric formed by a network of 10 control units.

The control unit 100 and the control unit 200 are connected to each other via the control unit network 10. The control unit network 10 is connected by network SW (switch) 10b, as shown in FIG. 2. SWs (switches) may be connected in multiple stages to form a spine-and-leaf type network or a fabric type network.

Thus, in this system, the memory possessed by the control unit (control unit 100 or control unit 200) is divided into memory connected to the CPU (memory 102 or memory 202) and memory connected to the network I/F (memory 105 or memory 205).

Then, as described below, the CPU of each control unit and the I/O cache controller of the network I/F shall be configured with a mechanism to manage the drive cache data. This example assumes that the memory connected to the network I/F of each control unit is volatile, but it may be configured as non-volatile memory. In this case, it is possible to reduce the number of backup batteries for the 100 control units.

Figure 3:
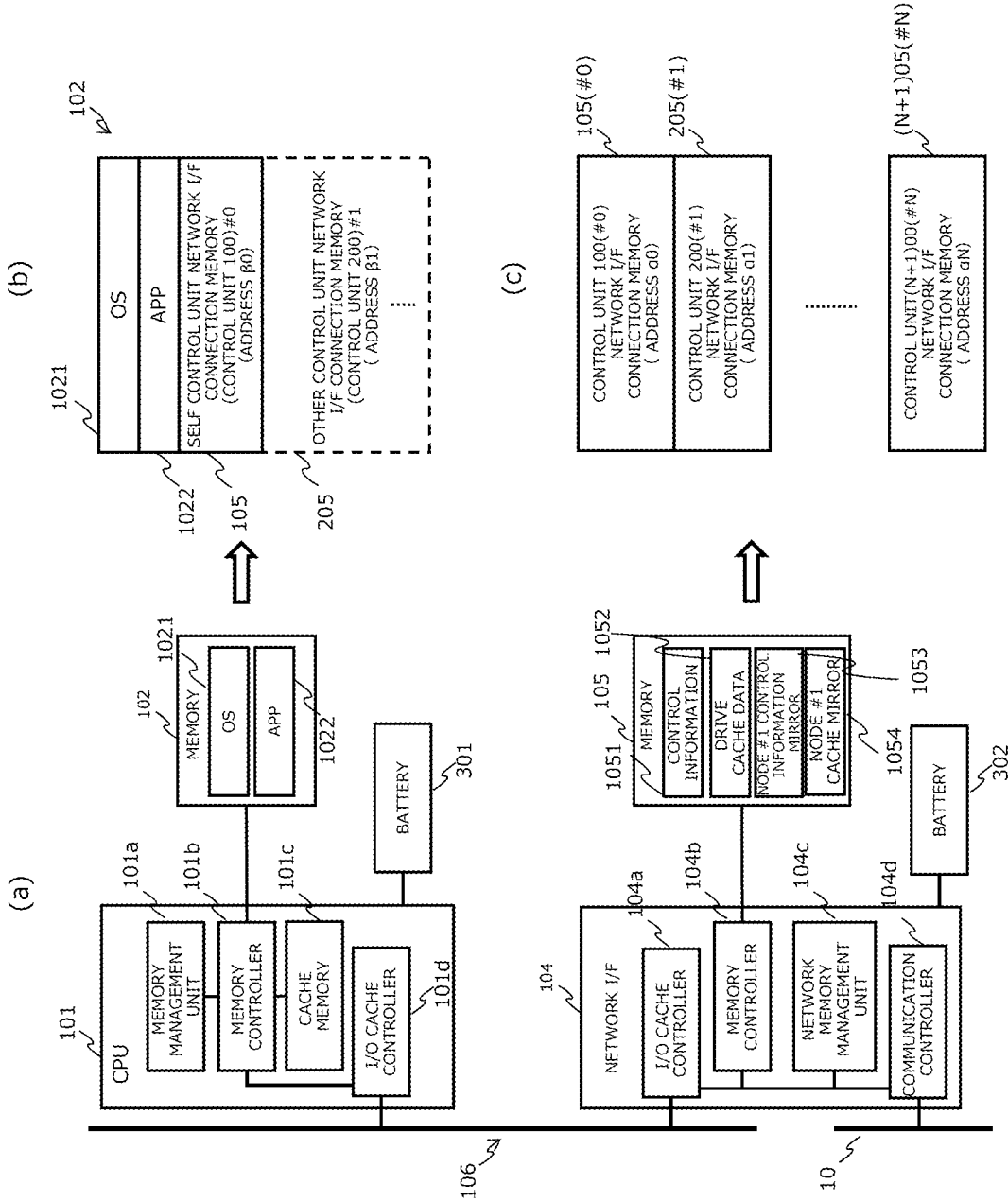
FIG. 3 shows an example of the CPU and network I/F configuration and memory map shown in FIG. 1.

FIG. 3 shows an example of the configuration and memory map of CPU 101 and network I/F 104 shown in FIG. 1. In FIG. 3, FIG. 3(*a*) shows a configuration diagram of CPU 101 and network I/F 104, FIG. 3(*b*) shows a physical address map of memory 102, 105 handled by CPU 101 and memory 205 connected to network I/F 204 . . . of other control units 200 . . . , FIG. 3(*c*) shows the physical address map of memory 105 handled by CPU 101 and memory 205 connected to the network I/F 204 . . . of other control units 200 . . . a map of on-network address. The on-network address is a virtual address uniquely determined corresponding to the physical address of memory 105, 205 . . . in each control unit connected to the control unit network 10, and is the address that can be identified in the storage system 1000.

FIG. 3 describes the control unit 100 as an example, but the same configuration is used for the control unit 200. The physical address map is stored in memory management unit 101a (described below), and the network memory address map is stored in network memory management unit 104c (described below). The same contents of the network memory address map are stored in each control unit. As an example, the network memory address map may be provided to each control unit from the network memory management unit (not shown) via the control unit network 10 for sharing. The same is true for the mirror data 1053 of other control information and the mirror data 1054 of the cache data of drive D accessed by the control information of other control units.

As shown in FIG. 3, CPU 101 comprises that memory management unit 101a, memory controller 101b, cache memory 101c, and I/O cache controller 101d.

The memory management unit 101a translates the physical addresses of the memory 102 connected to the CPU 101, the memory 105 connected to the network I/F 104 of the control unit 100, which is a self control unit, and the memory connected to the network I/F of other control units (for example, memory 205 of the control unit 200). When the CPU 101 accesses memory under the direction of the OS or application, the virtual address used by the OS or application is translated to the physical address (FIG. 3(*b*)) by the memory management unit 101a. If information is stored in memory 102, it instructs memory controller 101b to read and write the data, and if information is not stored in memory 102, it outputs access instructions and addresses to network I/F 104.

The memory controller 101b reads from and writes to the memory 102 based on the physical address (FIG. 3(*b*)) translated by the memory management unit 101a.

Cache memory 101c is a memory that temporarily stores duplicates of data stored in memory 102 and memory 105 of the self control unit 100 for high-speed access by the CPU 101.

The I/O cache controller 101d communicates with the network I/F 104 and other devices, such as the host network I/F 103 and drive I/Fs in FIG. 1, via bus 106. The cache memory 101c also controls which areas of memory 102 and memory 105 are duplicated in the cache memory 101c, whether the stored data is rewritten by the CPU, whether the data stored in the cache memory 101c is written back to memory 102 or memory 105 when necessary, and so on.

The cache memory 101c stores a duplicate of each data block (e.g., 64 kBytes) of a defined size in memory 102 or memory 105. The I/O cache controller 101d stores a table (not shown) of addresses indicating that data block, and when a request is received from the host to read or write data, it refers to the table to determine whether the requested data exists in the cache memory.

The I/O cache controller 101d also notifies upon request from the CPU 101 and network I/F of the status of the cache memory 101c, such as whether data duplicates of memory 102 or memory 105 are stored in the cache memory 101c and whether the stored data has been modified by the CPU 101 and writes back duplicate data in memory 102 or memory 105 that was stored in cache memory 102 to memory 102 or memory 105.

The network I/F 104 comprises that an I/O cache controller 104a, a memory controller 104b, a network memory management unit 104c, and a communication controller 104d.

I/O cache controller 104a communicates with CPU 101 and drive I/F 106 via bus 106. It writes drive D data sent from drive I/F 106 to drive cache data area 1052 of memory 105, writes data sent from CPU 101 to control information area 1051 and drive cache data area 1052 held in memory 105 according to the instructions of CPU 101, and sends data to CPU 101.

In addition to this, I/O cache controller 104a asks I/O cache controller 101d of CPU 101 whether duplicates of the data stored in memory 105 are stored in cache memory 101c, and requests that those data be written back to memory 105.

Memory controller 104b reads and writes data to memory 105 according to instructions from I/O cache controller 104a and communication controller 104d.

The network memory management unit 104c performs translation between the physical address of the CPU 101 (FIG. 3(*b*)) and the network memory address handled by the communication controller 104d (FIG. 3(*c*)). For the translation, the network memory management unit 104c refers to the physical address map and the network memory address map described above. In FIG. 3, for example, the network memory management unit 104c translates the physical address 131 of the memory 105 handled by the CPU 101 to the on-network address a1. The network address is assigned to a common memory map with the control unit 200, which is another control unit connected to the control unit network 10. Although the control unit 200 is shown here as an example of another control unit, the memory connected to the network I/F of other control units is allocated in the same way. The communication controller 104*d* uses the translated address al to read and write data to the memory 205 connected to the network I/F 204 of the control unit 200. FIG. 3 shows that drive cache data and control information of each control unit is allocated in the same address system (address α) of the common memory map on the network. By referring to the memory map on the on-network address al as a clue, it is possible to identify which control unit the memory 105, 205 . . . to which data is read or written belongs.

By adopting the configuration shown in FIG. 3, the memory 105 connected to the network I/F 104 of the control unit 100 and the memory 205 connected to the network I/F 104 of the control unit 200 are assigned to a common memory map by the network memory management units 104*c* and 204*c*. Similarly, the memory connected to the network I/F of other control unit s is also allocated. As a result, for example, when the control unit 100 writes a mirror of control information 1051 or drive cache data 1052 to control information 200 or other control units, the CPU 101 no longer needs to check the free memory of control unit 200 and other control units to determine which unit to write to. The CPU 101's capacity is no longer allocated to such management.

In addition, when the I/O cache controller 104*a* of the network I/F 104 accesses the memory 105 connected to the network I/F 104 by another control unit, for example, the control unit 200, via the communication controller 104*d*, the I/O cache controller 104*a* of the network I/F 104 asks the I/O cache controller 101*d* whether the data in the memory 105 When accessing memory 105 connected to network I/F 104 via communication controller 104*d*, for example, control unit 200 inquires I/O cache controller 101*d* whether the data in memory 105 that control unit 200 is trying to access is replicated and stored in cache memory 101*c* of CPU 101, and if it is stored in cache memory 101*c*, requests I/O cache controller 105*d* to write back the data in cache memory 101*c* to memory 105. This prevents the communication controller 104*d* from rewriting the data in memory 105 at the request of another control unit, e.g., control unit 200, and causing the data to differ from the data stored in cache memory 101*c*, thereby maintaining data consistency. In this system, it is assumed that I/O cache controller 101*d* of CPU 101 manages which areas are duplicated and stored in cache memory 101*c* for the two memories, memory 102 and memory 105, but I/O cache controller 104*a* may do this. And the I/O cache controller 101*d* and I/O cache controller 104*a* may work together.

Even if the CPU 101 is blocked for some reason and powered down for replacement, the CPU 101 and network I/F 104 may be configured as separate power sources to allow access to the memory 105 connected to the network I/F 104 from another control unit, such as the control unit 200. A battery may be provided in each control unit to transfer data stored in volatile memory elements such as SRAM and DRAM to non-volatile memory or drives such as Flash Memory in the event of a power failure of the control unit. In this case, batteries 301 and 302 may be installed to match the memory capacity of memory 102 and network I/F 105 connected to CPU 101 and the power consumption of CPU 101 and network I/F 105, respectively.

Figure 4:
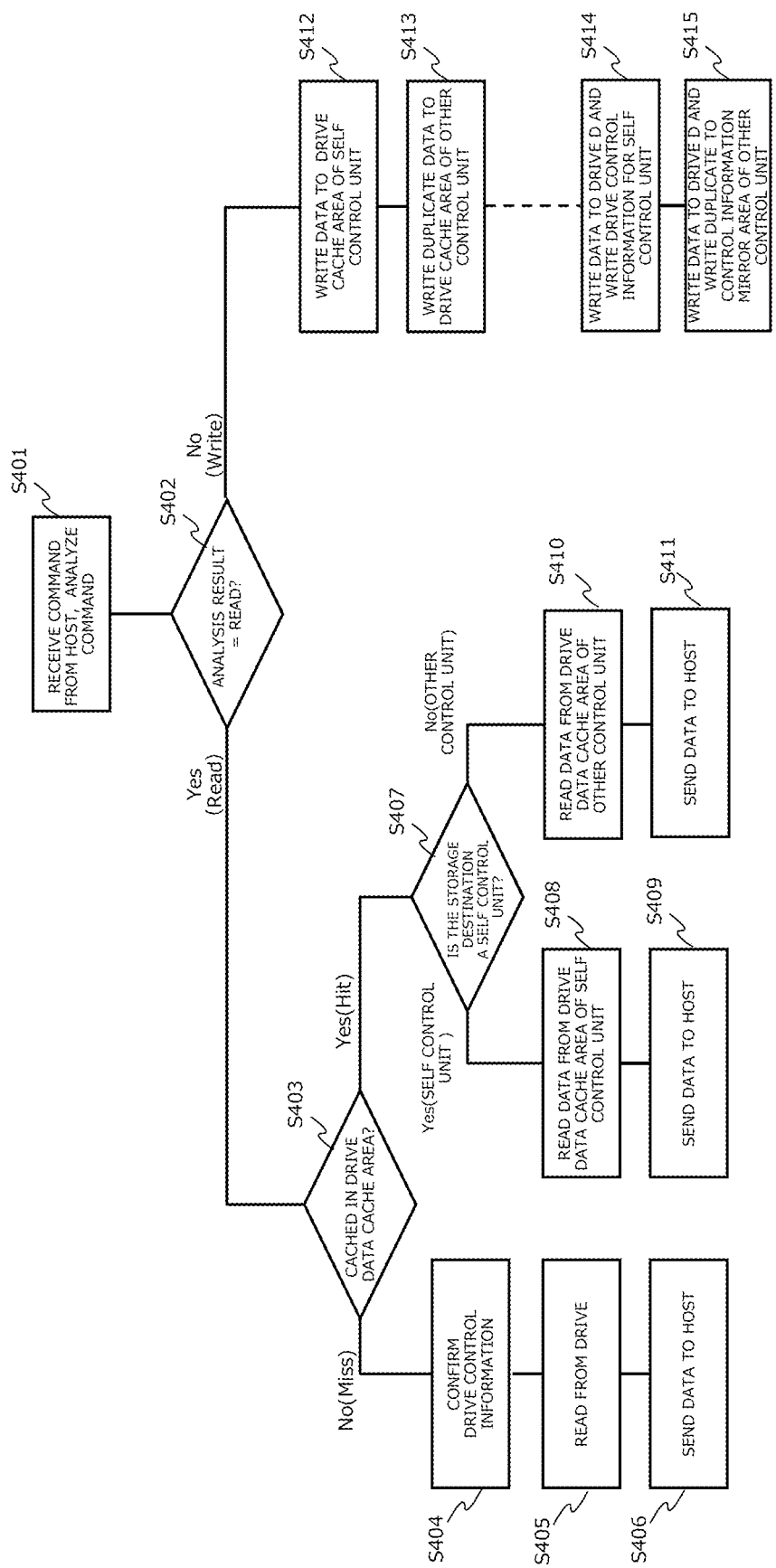
FIG. 4 shows an example flowchart of the processing procedure performed by the system's control unit.

The following is a description of the processing performed by this system. FIG. 4 is a flowchart showing an example of a processing procedure performed in the control unit of this system. The CPU 101 of the control unit 100 executes OS 1021 and application 1022 to analyze a command received by the host network I/F 103 from the host computer H (S401) and determine whether or not the command is a Read command (S402).

If CPU 101 determines that the command received from host computer H is a Read command (S402; Yes), it determines whether the data to be read is stored in the drive cache data area (e.g., drive cache data area 1052 for control unit 100, drive cache data area 2052 for control unit 200) of the memory (e.g., memory 105 in the case of control unit 100, memory 205 in the case of control unit 200) connected to the network I/F of each control unit (S403).

In S403, CPU 101 determines whether the target data is stored in the drive cache data area 1052 or the cache data area of another control unit (e.g., the drive cache data area 1052 of the control unit 200) based on the logical address of the logical volume of drive D of the target data to be read contained in the command (hereinafter referred to as the logical address of drive D) by referring to the control information 1052.

When the CPU 101 determines that the data to be read is not stored in the drive cache data area (e.g., drive cache data area 1052 for control unit 100, drive cache data area 2052 for control unit 200) of the memory connected to the network I/F of any control unit (S403; No), it obtains the physical address of the physical volume of drive D (hereinafter referred to as the physical address of drive D) from the drive control information area 1051 and reads the data from drive D via the drive interface 106 (S404, S405). CPU 101 sends the read data to network I/F 104 via bus 106 and further outputs the data to host network I/F 103. The host network I/F 103 sends the data to the host computer H as the data requested by the Read command (S406).

Further, CPU 101 sends the data read from drive D to network I/F 104 in S405, and network I/F 104 stores the above data in the drive cache data area 1052 of memory 105 connected to network I/F 104.

On the other hand, if CPU 101 determines that the data to be read is stored in the drive cache data area (e.g., drive cache data area 1052 in the case of control unit 100, drive cache data area 2052 in the case of control unit 200) (S403; Yes), CPU 101 outputs a Read request as an access request to the drive cache data area 1052 with an address indicating the position of the data added. The CPU 101 specifically identifies the physical address in the drive cache data area 1052 or cache mirror data 1054 where the target data is stored.

The network I/F 104 refers to the address included in the above Read request and determines whether the request is for data held in the memory 105 of its self control unit (S407). Specifically, the network management unit 104*c* translates the physical address appended to the Read request into an on-network address, and refers to the network memory address map (FIG. 3(*c*)) to determine which control unit the memory is in. If it is determined that the request is for data held in the memory 105 of the self control unit (S407; Yes), the network I/F 104 reads the data requested in the above Read request from the drive cache area 1052 (S408) and sends it to the CPU 101. The CPU 101 sends the data to the host network I/F 103, and the host network I/F 103 sends the data to the host computer H (S409). In this case, the network I/F may send the data directly to the host network I/F.

On the other hand, if the network I/F 104 determines from the address included in the Read request that it is not a request for data held in the memory 105 of its self control unit (S407; No), the network I/F 104 outputs the Read request to the communication controller 104d. At this time, the physical address 131 handled by the CPU 101 in the above Read request is translated to the on-network address a1 by the network memory management unit 104c. The communication controller 104d sends the above Read command to the communication controller 204d of the other control unit 200 according to the on-network address a1. The I/O cache controller 204a of the control unit 200 receives the Read command from the communication controller 204d. At this time, the on-network address a1 in the Read command is translated into a physical address the CPU 201 handled by the network memory management unit 204d. The I/O cache controller 204a reads the requested data from memory 205 and sends it as response data to the communication controller 204d (S410). At this time, the I/O cache controller 204a controls the cache memory of the CPU 201, which is described below using FIG. 6. Communication controller 204d sends the obtained data to communication controller 104d, communication controller 204d sends the response data to communication controller 104d, and communication controller 104d sends the data to the host via I/O cache controller 101d of CPU 101 through the reverse process of the previous step. The response data of the above Read command is sent to the network I/F 103. The host network I/F 103 sends that data to the host computer H (S411).

In S402, if the CPU 101 determines that the command received from the host computer H is not a Read command, i.e., a Write command (S402; No), the CPU 101 outputs a Write request with an address 130 of the memory 105 connected to the network I/F 104 as an access request to the cache data area 1052. CPU 101 may, for example, specify the physical address 130 as the physical address of the free space in the cache data area 1052.

The I/O cache controller 101d sends a Write request to the network I/F 104, and the I/O cache controller 104a of the network I/F that receives the Write request according to the Write request and writes the data to the drive cache data area 1052 of the memory 105 connected to the network I/F 104 (S412).

Furthermore, CPU 101 outputs a Write request to the I/O cache controller with an address indicating the drive cache data area of another control unit (e.g., address 131 corresponding to control unit 200) to create a duplicate of the drive cache data, and the I/O cache controller 101d sends the Write request to the network I/F 104. And the I/O cache controller 104a of the network I/F 104 that receives the Write request checks the address in the Write request. And if the address is found to be that of another control unit (e.g., address 131 corresponding to control unit 200), it sends a Write request to communication controller 104d. At this time, the physical address 131 handled by CPU 101 is translated to the on-network address a1 by the network memory management unit 104c. The communication controller 104d sends a Write request to the communication controller 204d of the control unit 200 according to the on-network address a1 included in the Write request, and the communication controller 204d of the control unit 200 sends the Write request to the I/O cache controller 204a. At this time, by the network memory management unit 204c, the on-network address a1 is translated into a physical address on the memory 205 handled by the CPU 201. When the I/O cache controller 204a receives the Write request from the communication controller 204d, the I/O cache controller 204a writes the data included in the Write request to the cache mirror area 2054 of the memory 205 connected to the network I/F 204d. At this time, the I/O cache controller 204a controls the cache memory of the CPU 201, which is described below using FIG. 8. The I/O cache controller 204a outputs to the CPU 101 via the communication controller 204d, the communication controller 104d, the I/O cache controller 104a, and the I/O cache controller 101d that the data has been written to the cache mirror area 2054. Thereafter, the host network I/F 103 transmits the above notification that the above was written to the host computer H (S413). In the above, it is assumed that one duplicate is created, but two or more may be created. In that case, the address added to the Write request should be adjusted so that the multiple duplicates are each written to a different control unit.

The data written to the drive cache data area 1052 of memory 105 is sent from the network I/F 104 to the drive I/F 106 and written to drive D when there is no more room in the drive cache area or at other times. At this time, information such as the write address of the drive is written to the control information area 1051 of memory 105 (S414), and a copy is written via communication controller 104d to the control information mirror area of memory connected to the network I/F of another control unit (e.g., the control information mirror area 2054 of the memory 205 connected to the network I/F 204 of the control unit 200) via communication controller 104d (S415).

Figure 5:
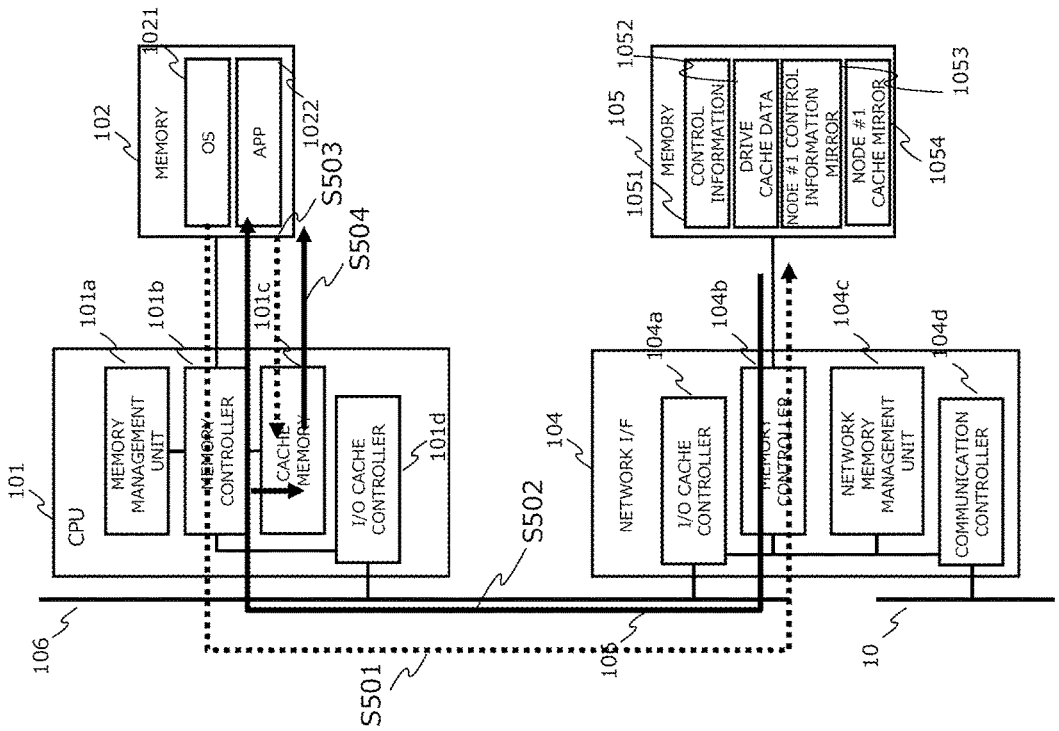
FIG. 5 illustrates the control of the Read operation when the data requested for Read is stored in a self control unit in S403 to S409.

The specific data control in the flowchart shown in FIG. 4 will now be explained. FIG. 5 illustrates the control of Read operation when the data requested for Read is stored in the drive cache data area 1052 of the self control unit in S403, S407 to S409. In FIG. 5, CPU 101 refers to the logical address information of the target data included in the Read command from the host computer H, and if the data is stored in the drive cache data area 1052, a Read request is output which is added the address indicating the storage location of the data (physical address 130 handled by CPU 101) to network I/F 104 (S501).

Network I/F 104 reads data from the drive cache area 1052 of memory 105 by memory controller 104b, and sends data for the Read request via I/O cache controller 104a and I/O cache controller 101d of CPU 101 to CPU 101. At this time, the data is also stored in cache memory 101c of CPU 101 (S502). CPU 101 performs necessary processing on the data and sends it to host computer H (S403, S407-S409).

If there is a Read request for the same data (S503), CPU 101 reads the data stored in cache memory 101c (S504) and then sends it to the host computer H. By using cache memory 101c of CPU 101, frequently accessed data does not need to read the data in memory 105 via network I/F 104, which speeds up the processing for the Read command.

Figure 6:
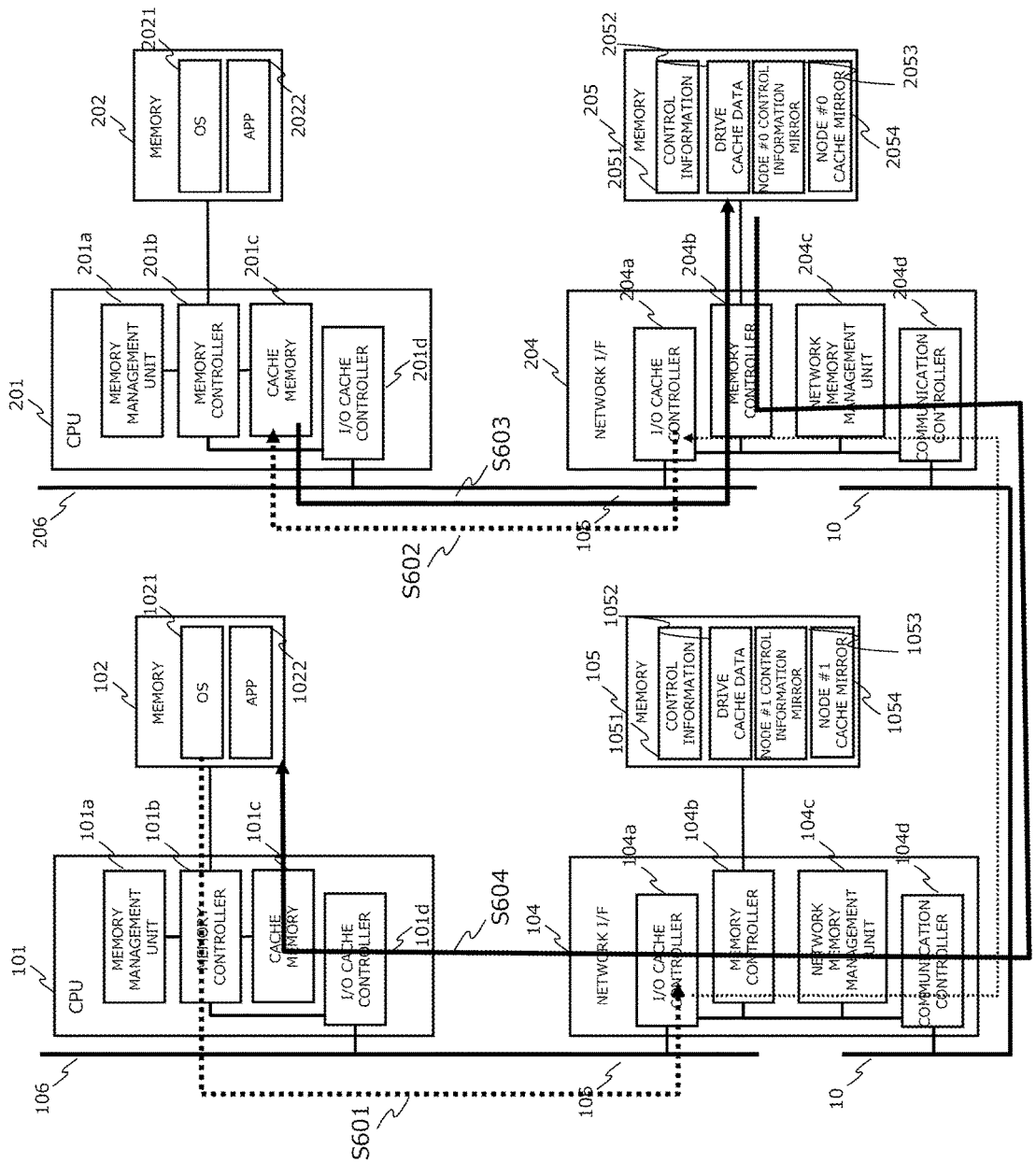
FIG. 6 illustrates the control of the Read operation when the data requested for Read is stored in another control unit in S403, S407, and S410-S411*b*.

Next, the case in which the Read requested data is stored in another control unit (in this example, control unit 200) is described. FIG. 6 illustrates the control of the Read operation when the Read requested data is stored in another control unit in S403, S407, and S410-S411b.

In FIG. 6, CPU 101 refers to the logical address information of the target data included in the Read command from the host computer H. If the data is stored in another control unit (in this example, control unit 200), the Read request added an address indicating the storage location of the data (the physical address (1 handled by the CPU 101) is output to the network I/F 104. The I/O cache controller 104a of the network I/F 104 refers to the address included in the Read request, and if it determines that the request is for another control unit (control unit 200 in this example), it sends the Read request to the communication controller 104d. At this time, the network memory management unit 104c translates the physical address 131 handled by the CPU 101c to the on-network address a1. Communication controller 104d refers to the on-network address β1 and sends a Read request to communication controller 204d of control unit 200. The communication controller 204d of the control unit 200 outputs the Read request to the I/O cache controller 204a. At this time, the on-network address β1 is translated to a physical address handled by CPU 201 by the network memory management unit 204c (S601). When I/O cache controller 204a receives the Read request, and the CPU 201 snoops and monitors whether the read requested data is stored in the cache memory 201c (S602).

As a result of snooping, I/O controller 204a finds that the data for which the above Read request is being made is stored in cache memory 201c, and (a) if the state of the area in cache memory 201c where the data is stored is in Exclusive state, the state of the area in cache memory 201c where the data is stored is changed to Shared state, and (b) if the state of the area where the data is stored in the cache memory 201c is Modify, the data is written back to the memory 205 (S603). If the data requested for Read above is not stored in the cache memory 201c, the I/O controller 204a does nothing to the cache memory 201c. When the above control ends, the I/O controller 204a reads the requested data from memory 205 and transmits it to the CPU 101 of the control unit 100 via the communication controller 204d, communication controller 104d, etc. (S604). At this time, CPU 101 does not store the data in cache memory 101c.

The modify state is a state in which a duplicate of the data in an area of memory 205 is stored in cache memory 201c and the duplicate data stored in cache memory 201c has been modified by the CPU 201 but has not been written back to memory 205 (dirty). When the I/O controller 204a reads the data in the area of the memory 205, the data in the cache memory 201c changed by the CPU 201 must be written back to the memory 205 and then the data in the area of the memory 205 must be read. Otherwise, the data will be read in which the change of the CPU 201 has not been reflected, and the consistency of the data cannot be maintained. The Exclusive state is a state in which the duplicate data of a certain area of memory 205 is stored only in cache memory 201c and is consistent (clean) with the values in memory 205. When a device other than CPU 201 is connected to the bus 206 and the device has a cache memory and the cache memory of the device stores the duplicate data of the same area of memory 205 as CPU 201, it is in the Shared state.

By performing the above operation when reading from another control unit (control unit 100 in this example) to memory 205, even if the other control unit (control unit 100 in this example) is blocked for some reason and control unit 200 takes over control unit 100's processing using control information mirror and drive cache mirror, the CPU 201 can duplicate and store frequently accessed data in the cache memory 201c, enabling high-speed processing. On the other hand, the area of memory 205 is divided into an area that can be duplicated and temporarily stored in cache memory 201c of CPU 201 and an area that cannot be duplicated and cannot be stored in cache memory 201c of CPU 201, and the control information 2051 and the drive cache data 2052 of control unit 200 are stored in the area where duplicates can be made, and control information mirrors other than control unit 200 (for example, control information mirror 2053 of control unit 100 (node #0)) and drive cache mirrors (for example, drive cache mirror 2054 of control unit 100 (node #0)) are stored in the area where duplicates cannot be made. In this case, the operations S602 and S603 can be omitted, and access from control units other than control unit 200 (e.g., control unit 100) can be faster. Either setting can be decided at the time of system configuration or can be dynamically switched during system operation. The size of each area may also be changed dynamically.

Figure 7:
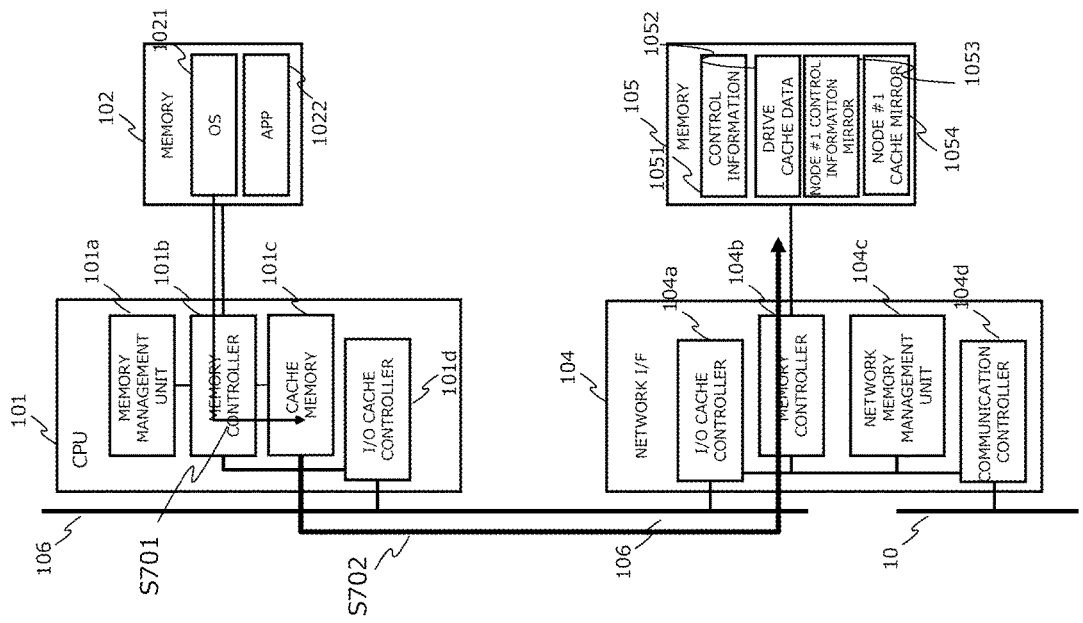
FIG. 7 illustrates the control of the Write operation when the data requested for Write is stored in the control unit in S412.

FIG. 7 illustrates the control of the Write operation when the data requested for Write is stored in the drive cache data area of the control unit in S412. In FIG. 7, CPU 101 refers to the logical address information of the data included in the Write command from the host computer H and outputs a Write request with the physical address handled by the corresponding CPU 101 to I/O cache controller 101d. The I/O cache controller 101d stores the data included in the Write request in cache memory 101c (S701). Since the data stored in cache memory 101c is in a different (dirty) state from the data stored in the corresponding memory 105, when there is no more space to store new data in cache memory 101c or when a request is received from I/O cache controller 104a, the data stored in cache memory 101c is written to memory 105 (S702).

CPU 101 can store data in cache memory 101c and write data to memory 105 simultaneously. The CPU 101 needs to wait until the writing process to the memory 105 is completed. However, since the data stored in the cache memory are not be in a different (dirty) state from the data stored in the memory 105, reliability can be improved.

Figure 8:
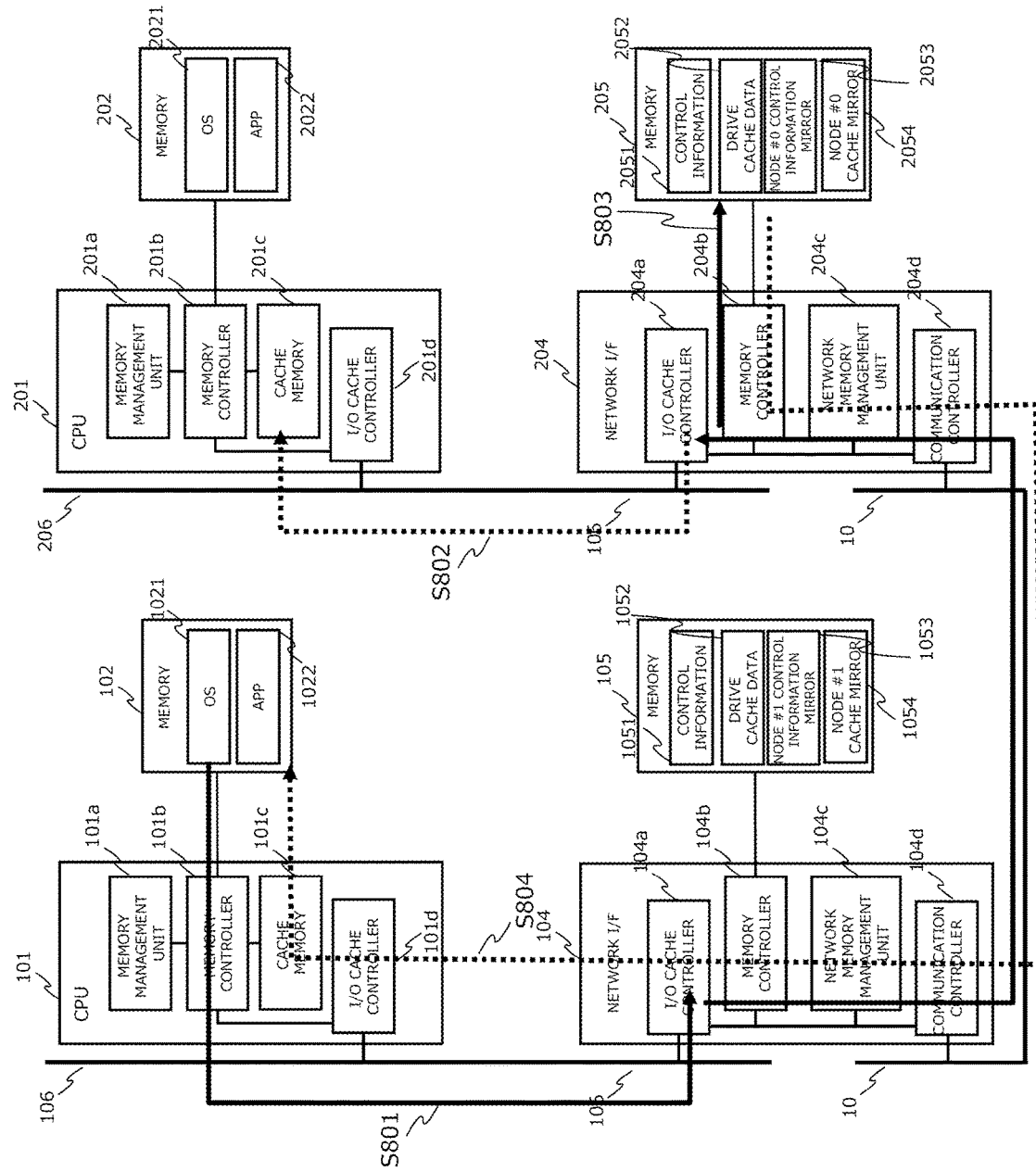
FIG. 8 illustrates the control of the Write operation in the case of duplicating and writing the Write-requested data to other control units in S413.

Furthermore, to increase the reliability of the storage system, the data included in the Write command from the host computer H is duplicated and stored in another control unit (in this example, control unit 200). FIG. 8 illustrates the control of the Write operation in the case of duplicating and writing the Write-requested data to other control units in S413.

In FIG. 8, in order to duplicate and store the Write-requested data in another control unit, the CPU 101 outputs a Write request to the network I/F 104, which adds an address to the other control unit (for example, address β1 corresponding to control unit 200), as described above. If the I/O cache controller 104a of the network I/F 104 determines from the address in the received Write request that the request is for the memory of another control unit (in this example, the memory 205 of the control unit 200), it outputs the Write request to the communication controller 104d. At this time, the network memory management unit 104c translates the physical address β1 of the CPU 101 to the on-network address al. Communication controller 104d sends the Write request to communication controller 204d of control unit 200. The communication controller 204d, which received the above Write request, outputs the Write request to the I/O controller 204a (S801). At this time, the on-network address al included in the Write request is translated to a physical address handled by the CPU 201 by the network memory management unit 204c. The I/O controller 204a snoops whether or not the CPU 201 stores the data of the address for which the write request is made in the cache memory 201c of the CPU 201 (S802).

If the cache memory 201c caches the data of the address in the above Write request, the I/O controller 204a changes the cache memory 201c to the Invalid state and then writes the data included in the above Write command to the cache mirror area 2054 of the memory 205 according to the address included in the Write request. The writing in S803 duplicates the data in the drive cache data area 1052 of the control unit 100 to which the data was written in the Write request, and even if the control unit 100 is closed, the data in the drive cache data area 1052 of the control unit 100 can be copied to the cache mirror area 2054 of the control unit 100. The data in the drive cache data area 1052 of the control unit 100 can be referenced by other control units even if the control unit 100 is blocked.

The Invalid state is a state in which the cache data in the cache memory 201c is invalidated. When the I/O controller 204a finishes writing in S803, it sends a notification of the end of the writing to the CPU 101 of the control unit 100 via the communication controller 204d and the communication controller 104d (S804).

In this example, in S804, only the notification of the end of the write is sent to the CPU 101, so the CPU 101 can confirm that the write was correctly performed with the said notification. Conventionally, after writing the above Write requested data, in order to confirm that writing has been performed correctly, the data or a part of the data was read to confirm that the write was completed successfully, but this method eliminates the need for such read processing.

FIG. 9 illustrates an example of the effect obtained by this system. As explained so far, this system has a configuration in which the memory possessed by the control unit is divided into memory connected to the CPU and memory connected to the network I/F. For example, as shown in (a) of FIG. 9, even if a failure occurs in CPU 101 or memory 102 of the control unit of this system and even if the unit 910 including CPU 101 and memory 102 is removed due to a failure of CPU 101 or memory 102 in the control unit of this system, access 9011 to the data stored in memory 105 from another control unit is possible via communication controller 104d, as shown in correspondence 901 in (b), and the storage system processing can be continued.

As shown in correspondence 902 in (c), unit 910' containing a new CPU 101' and memory 102' can be connected to unit 911 with existing network I/F 104 and memory 105 instead of unit 910 with a failed CPU 101 and memory 102. This makes the original system state can be restored without having to transfer mirror information stored in other control units. In this case, unit 910 including CPU 101 and memory 102 and unit 911 including network I/F 104 and memory 105 are separate power sources 903 and 904.

Figure 10A:
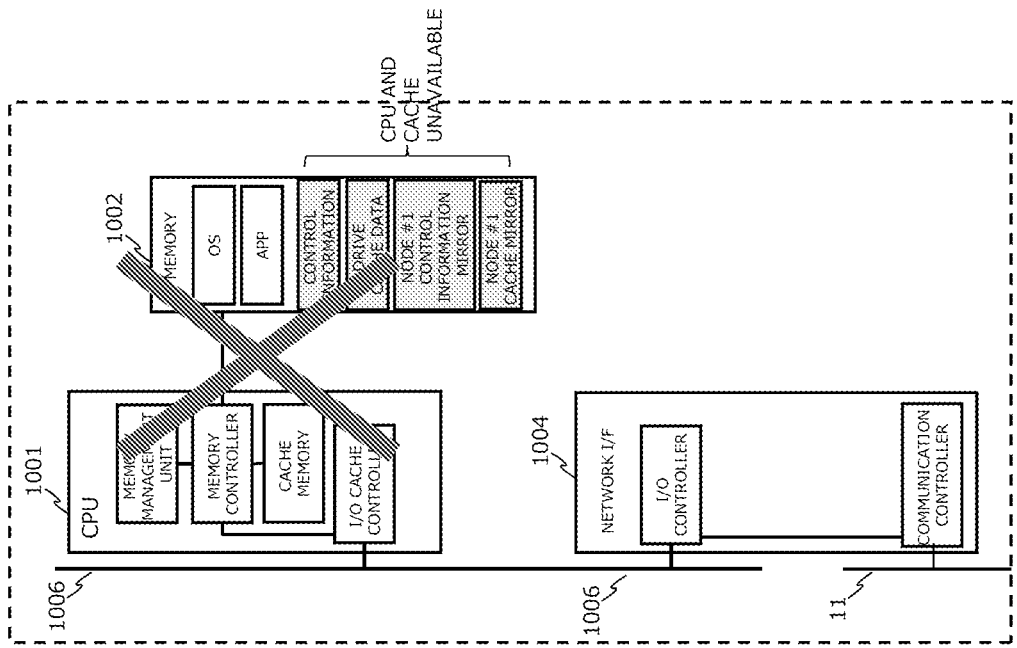
FIG. 10A illustrates the problems that may occur when a failure occurs in a control unit with the conventional configuration.

As shown in FIG. 10A, in a conventional configuration where a control unit with CPU 1001, memory 1002, host network I/F 1003, network I/F 1004, memory 1005, and drive I/F 1006 is connected to the control unit network 11, consider the case where CPU 1001 fails. In this case, the data stored in the memory 102 connected to the CPU 1001 becomes unusable. Since the data includes control information, drive cache data, mirror data of the control information of the other control unit, and mirror data of the cache data of the other control unit mentioned above, the reliability of the data will be reduced due to the fact that some data will no longer be duplicated.

In this conventional configuration, as shown in FIG. 10B, consider the case where the control information, the drive cache data, the mirror data of the control information of the other control unit and the mirror data of the cache data of the above other control unit are held in the memory connected to the extended memory 1004' via the bus. Even in this case, as a result of the bus becoming unavailable due to a failure of CPU 1001, access to extended memory 1004' and memory 1005 also becomes unavailable, resulting in reduced reliability as in FIG. 10A.

In the present example, memory 105 is connected to network I/F 104, as explained using FIG. 9, so that memory 105 can be accessed without being affected by the bus, even in the event of a failure of CPU 101. In addition, the network memory management unit implemented in the communication interface configured by the network I/F 104 has a function to translate the format and value of the physical address of the CPU and the on-network address used in the communication network. Therefore, even if one control unit fails, other control units can access the memory connected to the network interface of the failed control unit using the on-network address.

Example 2

Figure 11:
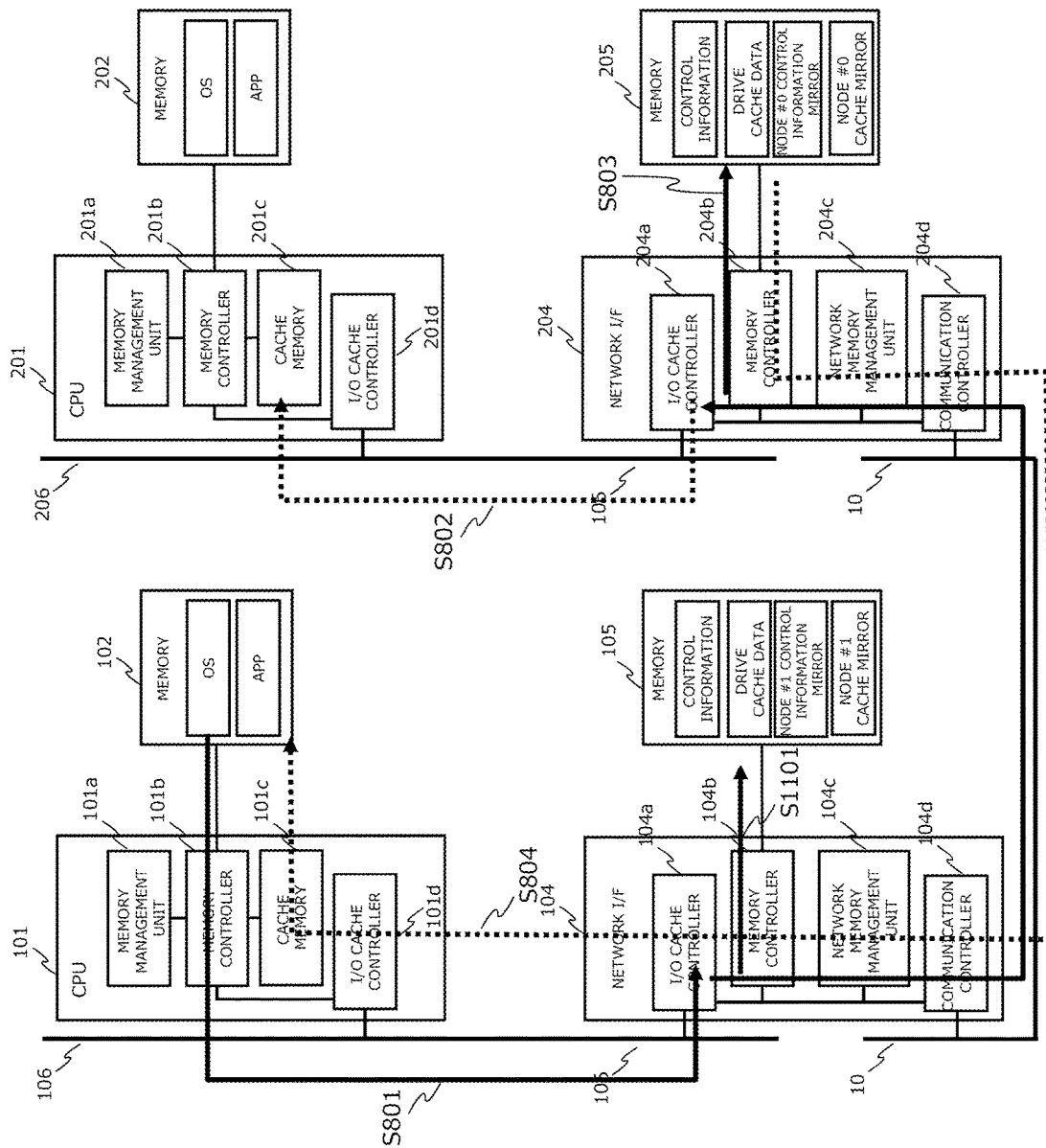
FIG. 11 illustrates other examples of Write requests and writing requested data (Example 2)

In Example 1, as explained in FIG. 4, the CPU 101 outputs a Write request to the network I/F 104 in each of the two steps, S412 and S413. However, as shown in FIG. 11, when the network I/F 104 receives a Write request from the CPU 101, via the memory controller 104b, the I/O cache controller 104a of the network I/F 104 can writes the data included in the Write request to the address location included in the Write request in the memory 105 and outputs the Write request to the communication controller 104d In outputting the Write request from the I/O cache controller 104a to the communication controller 104d, as in Example 1, the network memory management unit 104c translates the physical address of CPU 101 to an on-network address. By writing to memory 105 and mirroring to other control units in the network I/F, CPU 101 can complete the write operation in a single step, thereby improving system performance.

Example 3

In Examples 1 and 2, the control unit network 10 was explained on the assumption that network SW (switch) 10b is used, as shown in FIG. 2. However, the configuration of the control unit network 10 may be changed to other configurations. For example, if the number of control units are small by a certain degree, the network I/F of the control unit (network I/F 104 in the case of control unit #0) can have a switch function to reduce the cost of the network SW 10b.

Figure 12:
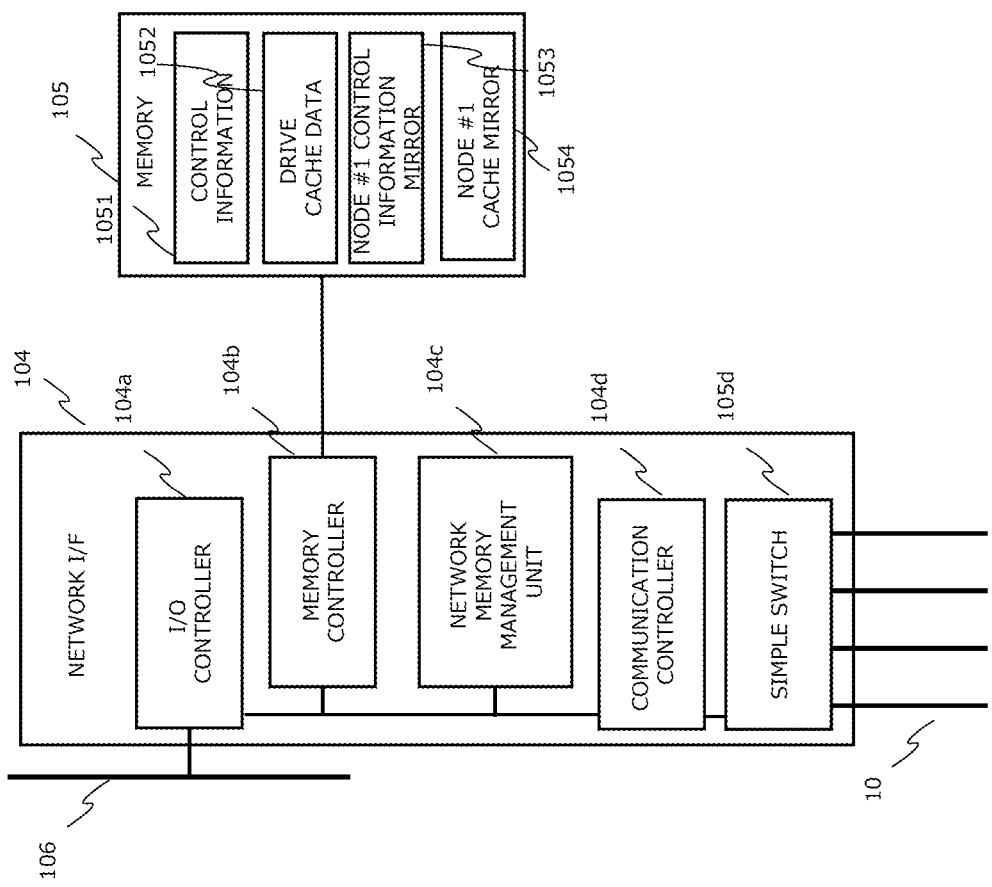
FIG. 12 shows an example of a configuration in which the control unit has a simple switch (Example 3)
Figure 13:
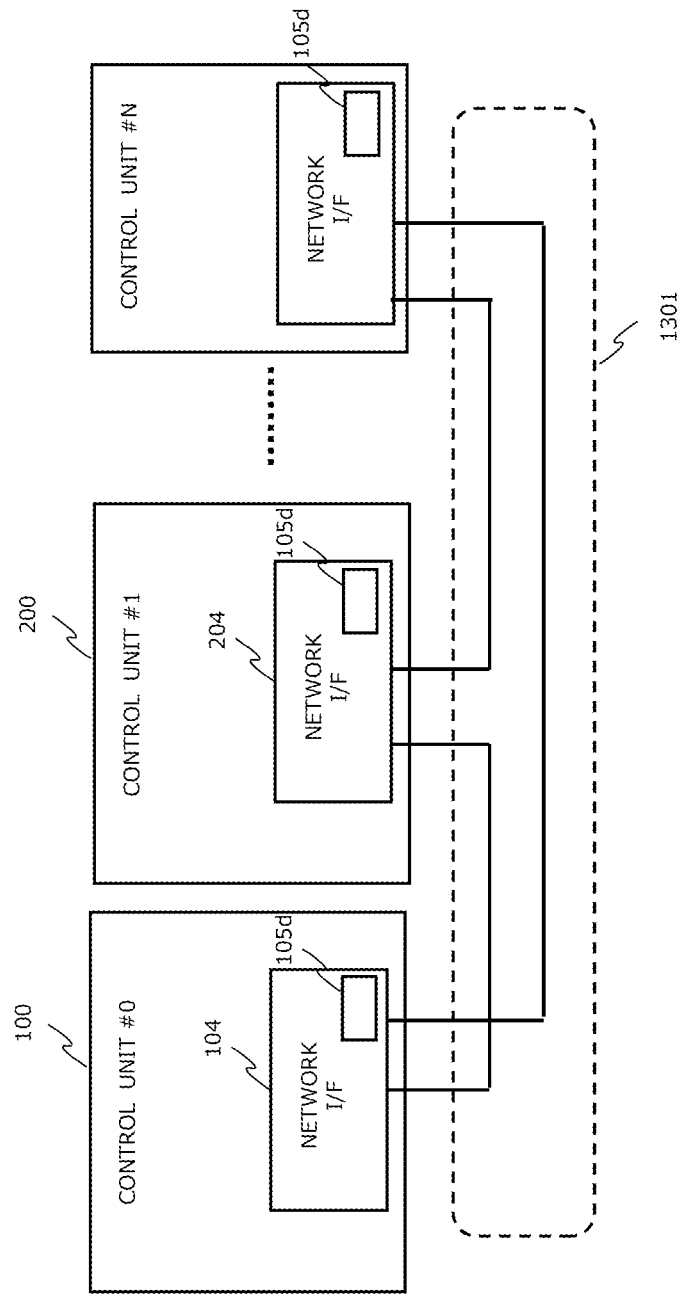
FIG. 13 shows another example of a control unit network (Example 3)
Figure 14:
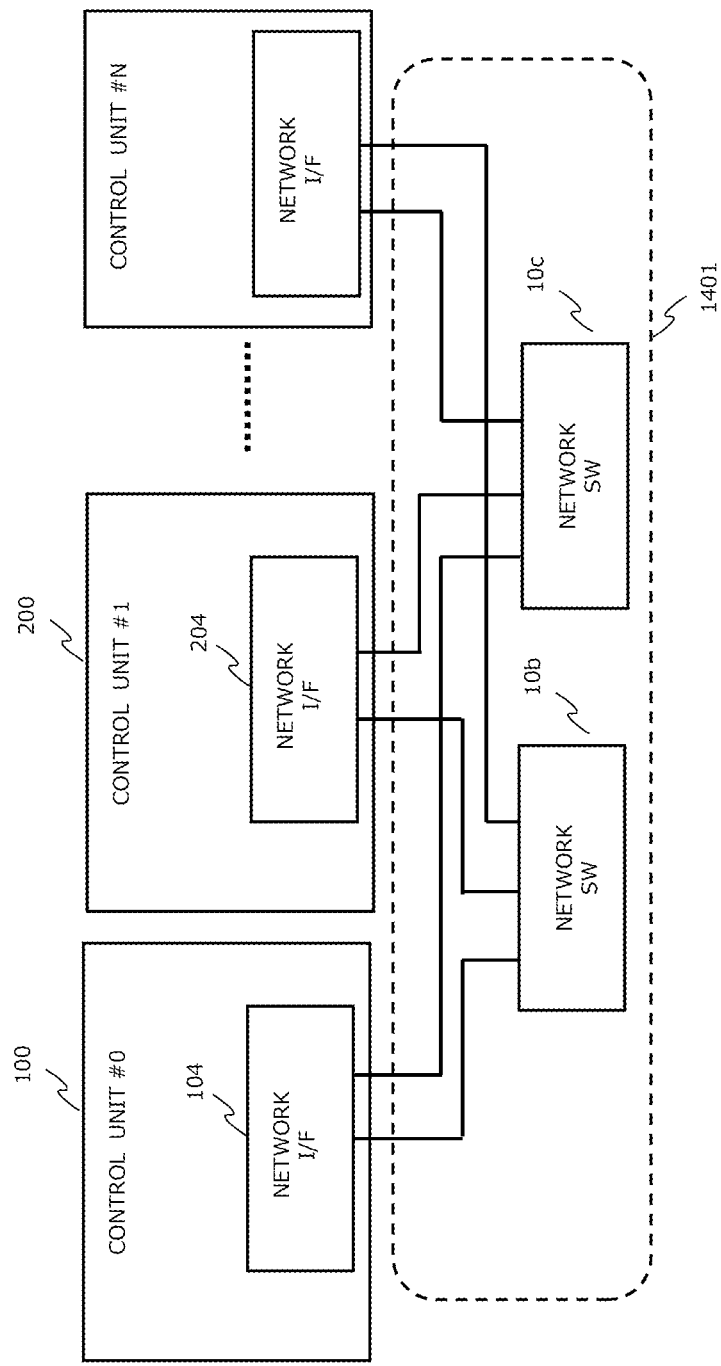
FIG. 14 shows another example of a control unit network (Example 3)

In FIG. 12, the network I/F 104 has a simple switch 105d in addition to the same configuration as in Example 1 and Example 2. By the network I/F 104 having a simple switch 105d, for example, as shown in FIG. 13, the control unit network can be configured as a control unit network 1301 that directly connects control units to each other, enabling this system to be implemented at low cost. Furthermore, as shown in FIG. 14, the control units can be connected to each other via multiple network switches (networks SW 10b and 10c in this example). This allows data to be sent and received over multiple paths, thus ensuring communication redundancy and improving system reliability.

Example 4

Figure 15:
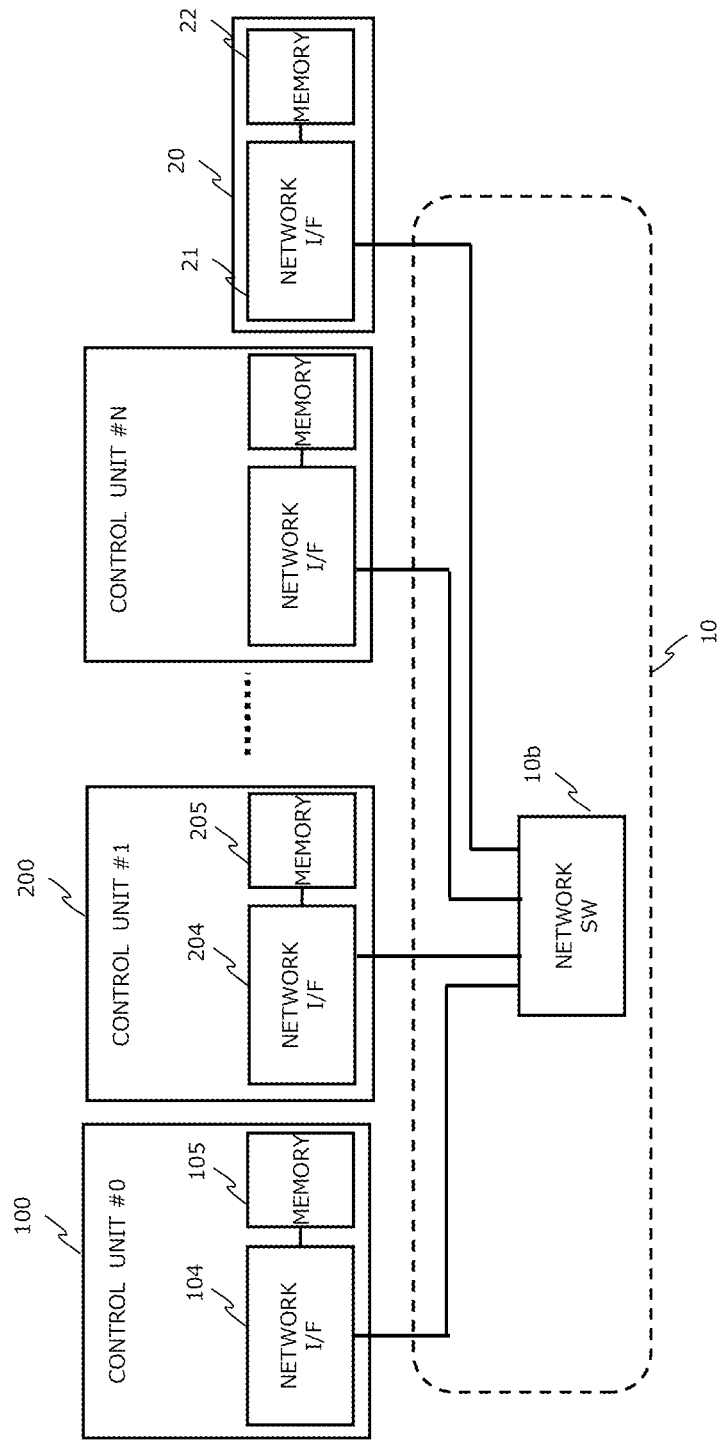
FIG. 15 shows an example of a configuration in which a memory unit is connected to this system (Example 4)

In Examples 1 through 3, the explanation is based on the assumption that the control unit is configured with a CPU 101, a memory 102 connected to the CPU 101, a network I/F 104, and a memory 105 connected to the network I/F 104. However, if the capacity of memory 105 is insufficient, as shown in FIG. 15, a memory unit 20 comprising network I/F 21 and memory 22 connected to network I/F 21 may be connected to this system. This allows the memory capacity of the entire system to be increased at a lower cost than adding the control unit shown in Examples 1 through 3. Although FIG. 15 shows an example in which one memory unit 20 is connected, the number of memory unit can be determined arbitrarily according to the environment in which this system is placed.

Example 5

Figure 16:
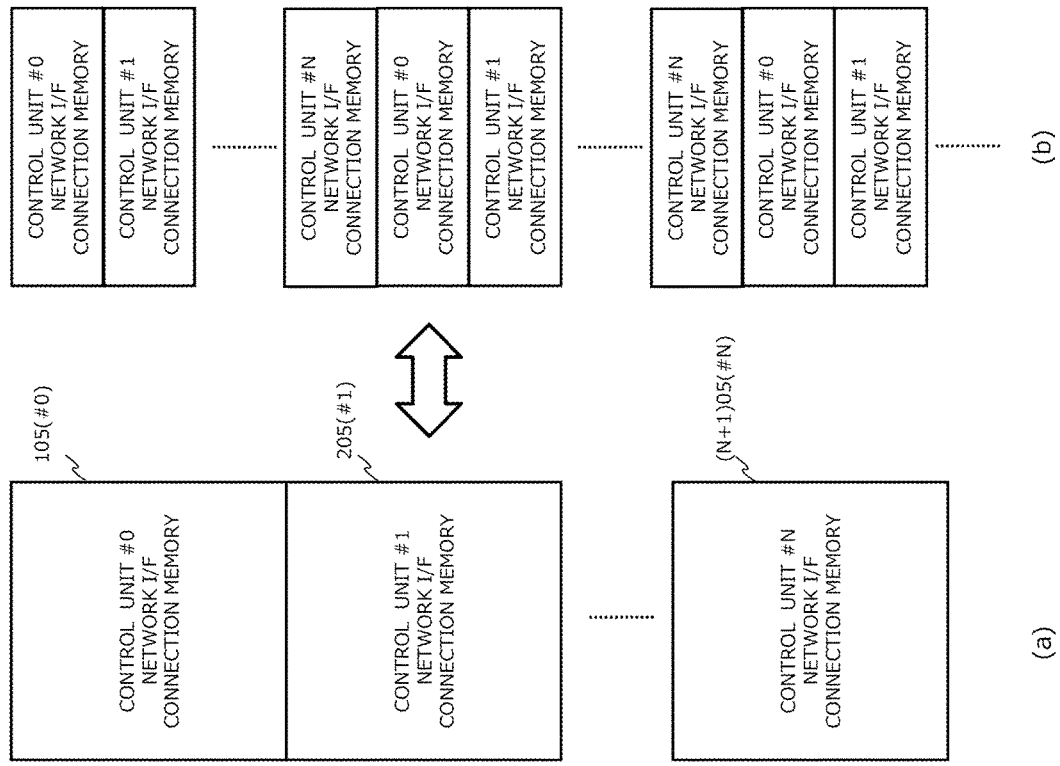
FIG. 16 shows another example of memory map configuration (Example 5).

In Examples 1 through 4, the on-network address were solidly allocated to each control unit as shown in FIG. 16(a).

However, the memory map allocation method is not limited to this. For example, as shown in FIG. 16(b), the on-network address can be divided into smaller areas, and a portion of each control unit's memory can be distributed in the divided areas according to certain rules (e.g., allocate in order starting with control unit #0, and when control unit #N is reached, return to control unit #0 and repeat).

By dividing on-network address into smaller pieces and assigning them to each control unit in a distributed manner, the memory connected to the network I/F of each control unit can be used equally without special load balancing processes, and load concentration on one particular control unit can be avoided.

If each control unit is directly connected via the simple switch shown in FIG. 12, it is possible to increase throughput by using this configuration and simultaneously accessing the memory distributed to each control unit.

As described above in Example 1, in a storage system 1000 having a plurality of control units that perform read control of data stored in a storage (drive D) and write control of the above data, the above plurality of control units (control unit s 100, 200, etc.) has a processor (CPU), a first memory (memory 102) connected to the above processor and storing software (e.g., OS 1021, application 1022) for performing the above read control and above write control processes, a network interface (e.g., network I/F 104) for connecting to a control unit network 10 connecting each of the above plurality of control units, a second memory (memory 105) stores the control information of the data subject to the above read control and above write control and the cache data of the above storage (e.g., control information 1051, drive cache data area 1052). This allows other control unit to continue accessing the memory connected to the network interface of the failed control unit even if the CPU of one of the multiple control units fails, increasing system availability.

As described in FIG. 3, the above network interface has at least an I/O controller (e.g., I/O cache controller 104a) for connecting to the above processor, a communication controller (e.g., communication controller 104d) for connecting to the above control unit network, and a memory management unit (e.g., network memory management unit 104c) for performing address translation. The network memory management unit is responsible for translating physical addresses handled by the CPU and network addresses when exchanging read and write requests between the I/O controller and the communication controller. This allows access to the above second memory via the memory controller using a common address (CPU physical address) for both requests from the self control unit and requests from the other control unit. On the other hand, since the memory connected to the network interface is managed by a common address for all control unit s on the control unit network, the communication controller 104d can access the memory (e.g., memory 205) connected to the network interface of other control unit without being aware of which control unit to access and simplifies the program. In the previous explanation, it was assumed that the physical address of the CPU is used for the address of the memory connected to the network I/F, but the on-network address can also be used. In this case, when the I/O cache controller (e.g., I/O cache controller 104a) of the network I/F receives a Read or Write request from the CPU, the I/O cache controller translates the CPU physical address by the network memory management unit to the on-network address and accesses the above second memory via the memory controller (e.g., memory controller 104b). In the case of access from other control units, the communication controller (e.g., communication controller 104d) that receives a Read or Write request accesses the memory (e.g., memory 105) via the memory controller (e.g., memory controller 104b). Since address conversion is not performed at this time, access from other control units can be made faster.

As explained using FIGS. 4, 6, etc., if the Read request from the CPU is not for the above second memory of the self control unit, the above network interface translates the CPU physical address to an on-network address using the network memory management unit and sends the Read request to the other control unit via the communication controller. The communication controller of the other control unit (e.g., communication controller 204d of control unit 200) translates the on-network address included in the Read request into a physical address handled by CPU 200 using network memory management unit 204c and sends it to I/O cache controller 204a. The I/O cache controller 204a checks (snoop) whether the data at the above address is stored in the cache memory 201c of the CPU 200. If the data is stored in cache memory 201c, the data in cache memory 201c is written back to memory 205. The above data is then sent to the control unit that made the Read request via 204d. With these controls, even in the case of a Read request from another control unit to the above second memory shared among the control units connected to the control unit network 10, the requested data can be read and sent while maintaining consistency with the cache memory of the CPU.

As explained using FIGS. 4, 8, etc., when the above network interface receives a request from the CPU to write mirror data to another control unit, it translates the CPU physical address to an on-network address using the network memory management unit and sends a Read request to the other control unit via the communication controller The read request is sent to the other control unit via the communication controller. The communication controller of the other control unit (e.g., communication controller 204d of control unit 200) translates the on-network address included in the Read request into the physical address of CPU 200 using network memory management unit 204c and sends it to I/O cache controller 204a. I/O cache controller 204a checks (snoop) whether the data of the above address is stored in the cache memory 201c of the CPU 200. If the data is stored in the cache memory 201c, the data in the cache memory 201c is set to Invalid state, and then the data included in the Write request is written to the memory 205. This allows the requested data to be written while maintaining consistency with the CPU's cache memory, even in the case of a mirror data write to another control unit.

As explained using FIGS. 12, 13, etc., each of the above plurality of control units may have a switch in the network I/F to connect to the above control unit network and each of the plurality of control units may be connected via the switch. This reduces the cost of the network switch.

The present invention is not limited to the above embodiment as it is, but can be embodied by transforming the components to the extent that it does not depart from the gist thereof in the implementation stage, or by combining multiple components disclosed in the above embodiment as appropriate.

What is claimed is:

1. A storage system having a plurality of control units that perform read control of data stored in a storage and write control of the data, the storage system comprising:
   each of the plurality of control units has:
   a processor;

a first memory connected to the processor and storing software for executing a process of read control and write control;
a network interface for connecting to a control unit network that connects each of the plurality of control units; and
a second memory connected to the network interface and storing control information of the data subject to read control and write control and cache data of the storage,
wherein a first control unit of the plurality of control units accesses a second memory of a second control unit of the plurality of control units by translating an address of the second memory of the second control unit into an on-network address identifiable on the control unit network,
wherein the network interface has at least:
an I/O cache controller to communicate with the processor,
a communication controller to connect to the control unit network, and
a memory management unit to perform address translation, and
wherein the memory management unit:
translates the address of the second memory of the second control unit handled by the processor to the on-network address handled by the communication controller when the I/O cache controller of the network interface sends an access request to the communication controller to the processor to access the second memory of the second control unit connected to the control unit network, and
translates the on-network address handled by the communication controller to the address of the second memory of the second control unit handled by the processor when the communication controller sends an access request from the second control unit to the I/O cache controller of the network interface.

2. The storage system according to claim 1, wherein when the network interface receives a read request for the second memory of the second control unit via the communication controller from the second control unit connected to the control unit network,
the I/O cache controller checks whether the data in the second memory of the second control unit requested in the read request is stored in a cache memory of the processor and whether the cache memory has been rewritten by the processor,
when the data was stored and rewritten in the cache memory, the I/O cache controller writes the data in the cache memory back to the second memory of the second control unit, and
after the write back is completed, the read request from the second control unit is executed.

3. The storage system according to claim 1, wherein when the network interface receives a write request for data,
the I/O cache controller writes the data included in the write request to the second memory of the second control unit according to the address of the second memory of the second control unit handled by a processor included in the write request,
outputs the write request to the communication controller,
the communication controller sends the write request to the second control unit connected to the control unit network according to the on-network address translated from the address of the second memory of the second control unit handled by the processor by the memory management unit,
the second control unit writes the data included in the write request as duplicate data in the second memory of the second control unit connected to the network interface of the second control unit according to the write request received.

4. The storage system according to claim 1, wherein each of the plurality of control units is configured to have;
a first unit comprising the processor and the first memory, and
the network interface and a second unit, and
wherein each of the plurality of control units has its own power supply.

5. The storage system according to claim 1, wherein each of the plurality of control units has a respective switch for connection to the control unit network, and
each of the plurality of control units is connected via the respective switch.

6. A data control method performed in a storage system having a plurality of control units that perform read control of data stored in a storage and write control of the data, the data control method comprising:
in each of the plurality of control units,
storing software in a first memory to perform a process of read control and write control by a processor, in which the software is connected to the processor, and
storing control information, and cache data of the storage system, of data which are subject to the read control and the write control in a second memory by a network interface for connecting to a control unit network connecting each of the plurality of control units, in which the software is connected to the network interface,
wherein a first control unit of the plurality of control units accesses a second memory of a second control unit of the plurality of control units by translating an address of the second memory of the second control unit into an on-network address identifiable on the control unit network,
wherein the network interface has at least:
an I/O cache controller to communicate with the processor,
a communication controller to connect to the control unit network, and
a memory management unit to perform address translation, and
wherein the memory management unit:
translates the address of the second memory of the second control unit handled by the processor into the on-network address when the I/O cache controller of the network interface sends an access request to the communication controller, and
translates the on-network address handled by the communication controller to the address of the second memory of the second control unit handled by the processor when the communication controller sends an access request from the second control unit to the I/O cache controller of the network interface.

7. The data control method according to claim 6, wherein when the network interface receives a read request for the second memory of the second control unit via the communication controller from the second control unit connected to the control unit network,
the I/O cache controller checks whether the data in the second memory of the second control unit requested in the read request is stored in a cache memory of the processor and whether the cache memory has been rewritten by the processor, when the data was stored and rewritten in the cache memory, the I/O cache controller writes the data in the cache memory back to the second memory of the second control unit, and after the write back is completed, the read request from the second control unit is executed.

* * * * *